(12) United States Patent
Karabacak et al.

(10) Patent No.: US 11,509,365 B1
(45) Date of Patent: Nov. 22, 2022

(54) SYSTEM AND METHOD FOR DYNAMIC SIDELOBE MULTIPLEXING IN BEAMSPACE MIMO SYSTEMS

(71) Applicant: University of South Florida, Tampa, FL (US)

(72) Inventors: Murat Karabacak, Tampa, FL (US); Liza Afeef, Istanbul (TR); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 17/550,576

(22) Filed: Dec. 14, 2021

Related U.S. Application Data

(60) Provisional application No. 63/125,657, filed on Dec. 15, 2020.

(51) Int. Cl.
*H04B 7/0456* (2017.01)
*H04B 17/336* (2015.01)
*H04B 7/06* (2006.01)

(52) U.S. Cl.
CPC ......... *H04B 7/0456* (2013.01); *H04B 7/0697* (2013.01); *H04B 17/336* (2015.01)

(58) Field of Classification Search
CPC .... H04B 7/0695; H04B 7/0408; H04B 15/00; H04B 1/1027; H04B 7/0456; H04B 17/336; H04B 7/0697
See application file for complete search history.

(56) References Cited

U.S. PATENT DOCUMENTS

| | | | | |
|---|---|---|---|---|
| 6,694,235 | B2* | 2/2004 | Akiyama | H04L 67/12 455/418 |
| 9,929,791 | B2* | 3/2018 | Seol | H04B 7/0632 |
| 11,012,131 | B2* | 5/2021 | Hao | H04B 1/7102 |
| 2021/0344393 | A1* | 11/2021 | Dai | H04B 7/088 |

OTHER PUBLICATIONS

Brady, J. et al., Beamspace MIMO for Millimeter-Wave Communications: System Architecture, Modeling, Analysis, and Measurements, IEEE Transactions on Antennas and Propagation, vol. 6, No. 7, Jul. 2013.
Busari, S. A. et al., Millimeter-Wave Massive MIMO Communication for Future Wireless Systems: A Survey, IEEE Communications Surveys & Tutorials, vol. 20, No. 2, Second Quarter 2018.
Gao, X. et al., Reliable Beamspace Channel Estimation for Millimeter-Wave Massive MIMO Systems with Lens Antenna Array, http://arxiv.org/abs/1707.07624v2, pp. 1-12, Aug. 2017.
Han, S. et al., Large-Scale Antenna Systems with Hybrid Analog and Digital Beamforming for Millimeter Wave 5G, Millimeter-Wave Communications for 5G, IEEE Communications Magazine, pp. 186-194, Jan. 2015.

(Continued)

*Primary Examiner* — Khanh C Tran
(74) *Attorney, Agent, or Firm* — Smith & Hopen, P.A.; Molly L. Sauter

(57) ABSTRACT

A system and method utilizing a novel dynamic sidelobe multiplexing (DSM) is proposed for the applications in beamspace multiple-input multiple-output (MIMO) systems. The DSM technique pre-codes the transmitted data over transmitter beams in order to open up a new path to the receiver.

19 Claims, 5 Drawing Sheets

(56) References Cited

OTHER PUBLICATIONS

Heath, Jr., R. W. et al., An Overview of Signal Processing Techniques for Millimeter Wave MIMO Systems, IEEE J. Sel. Topics in Signal Process., vol. 10, No. 3, pp. 436-453, 2015.

Hemadeh, I. A. et al., Millimeter-Wave Communications: Physical Channel Models, Design Considerations, Antenna Constructions, and Link-Budget, IEEE Communications Surveys & Tutorials, vol. 20, No. 2, Second Quarter, 2018.

Kamble, V. N. et al., A Novel User Clustering based Beamspace MIMO-NOMA, 2019 IEEE 9th IACC. IEEE, 2019, pp. 50-54.

Li, J. et al., Beamspace MIMO-NOMA for Millimeter-Wave Broadcasting via Full-Duplex D2D Communications, IEEE Transactions on Braodcasting, vol. 66, No. 2, Jun. 2020.

Lin, Z. et al., Millimeter-Wave Propagation Modeling and Measurements for 5G Mobile Networks, IEEE Wireless Commun., vol. 26, No. 1, 2018.

Ling, B. et al., Multiple Decision Aided Successive Interference Cancellation Receiver for NOMA Systems, IEEE Wireless Communications Letters, vol. 6, No. 4, Aug. 2017.

Liu, P. et al., Energy-Efficient Power Allocation for Millimeter Wave Beamspace MIMO-NOMA Systems, IEEE Access, vol 7, pp. 114 582-114 592, 2019.

Patel, P. et al., Analysis of a Simple Successive Interference Cancellation Scheme in a DS/CDMA System, IEEE Journal on Selected Areas in Communications, vol. 12, No. 5, Jun. 1994.

Pi, Z. et al., An Introduction to Millimeter-Wave Mobile Broadband Systems, Topics in Radio Communications, IEEE Communications Magazine, pp. 101-107, Jun. 2011.

Rappaport, T. S. et al., Overview of Millimeter Wave Communications for Fifth-Generation (5G) Wireless Networks With a Focus on Propagation Models, IEEE Transactions on Antennas and Propagation, vol. 65, No. 12, Dec. 2017.

Sayeed, A. et al., Beamspace MIMO for High-Dimensional Multiuser Communication at Millimeter-Wave Frequencies, Globecom 2013—Wireless Communications Symposium, IEEE, 2013, pp. 3679-3684.

Wang, B. et al., Spectrum and Energy-Efficient Beamspace MIMO-NOMA for Millimeter-Wave Communications Using Lens Antenna Array, IEEE Journal on Selected Areas in Communications, vol. 35, No. 10, Oct. 2017.

Wang, B. et al., Beamspace MIMO-NOMA for Millimeter-Wave Communications Using Lens Antenna Arrays, 2017 IEEE 86th VTC-Fall. IEEE, 2017, pp. 1-5.

Liu, P. et al., Multi-Beam NOMA for Millimeter-Wave Massive MIMO With Lens Antenna Array, IEEE Transactions on Vehicular Technology, Aug. 2020.

Xue, Q. et al., Beamspace SU-MIMO for Future Millimeter Wave Wireless Communications, IEEE Journal on Selected Areas in Communications, vol. 35, No. 7, pp. 1564-1575, 2017.

Yang, K. et al., A Uniform Beam Selection Algorithm for Beamspace MIMO-NOMA in Millimeter-Wave Communication System, 2018 15th ICCWAMTIP. IEEE, 2018, pp. 166-169.

Zeng, Y. et al., Millimeter Wave MIMO With Lens Antenna Array: A New Path Division Multiplexing Paradigm, IEEE Transactions on Communications, vol. 64, No. 4, Apr. 2016.

\* cited by examiner

SYSTEM AND METHOD FOR DYNAMIC SIDELOBE MULTIPLEXING IN BEAMSPACE MIMO SYSTEMS

CROSS-REFERENCE TO RELATED APPLICATIONS

This application claims priority to U.S. Provisional Patent Application No. 63/125,657, filed Dec. 15, 2020, and entitled "SYSTEM AND METHOD FOR DYNAMIC SIDELOBE MULTIPLEXING IN BEAMSPACE MIMO SYSTEMS", which is herein incorporated by reference in its entirety.

GOVERNMENT SUPPORT STATEMENT

This invention was made with government support ECCS-1609581 awarded by the National Science Foundation. The government has certain rights in the invention.

BACKGROUND OF THE INVENTION

The tremendous growth in communication systems has already filled-up the traditional microwave spectrum. Continued interest in data greedy wireless applications has led the cellular industry to seek new frequencies for utilization of next-generation wireless technologies. Millimeter-wave (mmWave) communication has become a promising technology to support wireless systems for larger bandwidth and higher data rates in fifth-generation (5G) networks.

Multiple-input multiple-output (MIMO) and mmWave integration has been estimated as one of the key technologies in 5G wireless communication systems to compensate for the severe path loss. However, as each antenna element in MIMO systems requires one devoted radio-frequency (RF) chain, the hardware complexity and energy consumption become excessive with large number of antenna elements. Investigations have shown that beamspace MIMO can provide an efficient solution to this problem. The implementation of electromagnetic lenses in beamspace MIMO, replaces phase shifters with switches which increases energy efficiency. The direction of the generated beam is controlled by switching between the antenna apertures placed on the focal plane of the lens. Beamforming with the lens antenna array is not only a cost-efficient solution but also achieves similar directivity gain with simplified hardware. Thus, lens antennas show a promising future in mmWave systems. Previous studies have been provided regarding beam tracking and beam selection for effective communication in beamspace MIMO, for example by providing a channel estimation scheme based on a reliable support detection which is proposed to overcome exhaustive overhead processing of the beamspace MIMO channel. According to these previous work in the field, the number of users/streams that can be supported at the same time-frequency resource is limited with the number of RF chains in conventional multiplexing of beamspace MIMO systems. To overcome this limitation, the concept of non-orthogonal multiple access (NOMA) with beamspace MIMO has been proposed. Following this work, others presented a power allocation method for beamspace MIMONOMA systems using sequential convex approximation with energy-efficiency goal. Similarly, others have proposed user clustering in the beamspace MIMO-NOMA system for further enhancement in energy and spectrum efficiency, while a pre-coding technique is used inside each cluster to reduce the inter-user and inter-beam interferences. Another NOMA variant has been previously introduced for beamspace MIMO-NOMA, referred to as layered division multiplexing (LDM) to integrate mmWave MIMO system with full-duplex device-to-device communications, in order to implement broadcast and unicast services. It has also been suggested that clustering a few users on a single beam with a small bandwidth to implement NOMA limits its potential for energy efficiency, and a proposed beam splitting scheme to serve more users located in different beam coverage has also been described.

Despite the advantages of previous research, an improved system and method for implementing beamspace MIMO is needed in the art.

SUMMARY OF THE INVENTION

The present invention provides a novel multiplexing method, referred to as "Dynamic Sidelobes Multiplexing (DSM)", that allows additional data streams to be multiplexed and reconstructed. The main contribution of the proposed DSM method is to introduce additional receiver beams to open up new paths to receive the additional streams that are transmitted under the main signal. Due to multipath effects of the environment, the signal gathered on the additional beams are not only from main lobes of the transmitted beams but also from the sidelobes. Therefore, in the proposed DSM method, the Tx and Rx beams are dynamically selected to maximize the goal function, i.e., capacity and signal-to-interference plus noise ratio (SINR).

In one embodiment, the present invention provides a method for dynamic sidelobe multiplexing in beamspace multiple-input multiple-output (MIMO) systems, which includes, receiving a plurality of data streams at a beamspace MIMO transmitter and pre-coding a number of the plurality of received data streams into a number of pre-coded signals, wherein the number of data streams is greater than the number of pre-coded signals. The method further includes, transmitting a first one of the pre-coded signals through a first radio frequency (RF) chain coupled to a first transmitting antenna element of the beamspace MIMO transmitter and transmitting a second one of the pre-coded signals through a second RF chain coupled to a second transmitting antenna element of the beamspace MIMO transmitter and transmitting the first pre-coded signal and the second pre-coded signal over a multipath channel using the respective first transmitting antenna element and second transmitting element of the beamspace MIMO transmitter. The method additionally includes, receiving a first one of the two pre-coded signals transmitted over the multipath channel at a first RF chain coupled to a first receiving antenna element of a beamspace MIMO receiver and receiving a second one of the two pre-coded signals transmitted over the multipath channel at a second RF chain coupled to a second receiving antenna element of the beamspace MIMO receiver, receiving a third pre-coded signal transmitted over the multipath channel at a third RF chain coupled to a third receiving antenna element of the beamspace MIMI receiver, wherein the third pre-coded signal comprises main lobe and sidelobe power from each of the first pre-coded signal and the second pre-coded signal and decoding each of the received first, second and third pre-coded signals to recover the number of data streams.

In the method of the present invention, the decoding of the received pre-coded signals may be accomplished by demodulating the first pre-coded signal based upon an interference of the third pre-coded signal to recover a first data stream, demodulating the second pre-coded signal based upon the interference of the third pre-coded signal to recover a second data stream and using the first data stream and the second data stream to remove the interference from the third pre-coded signal by subtraction to recover a third data stream.

In another embodiment, the present invention provides a transceiver using dynamic sidelobe multiplexing for beamspace MIMO systems. The transceiver includes a beamspace MIMO transmitter comprising a digital precoder for pre-coding a number of a plurality of received data streams into a number of pre-coded signals, wherein the number of data streams is greater than the number of pre-coded signals. The transmitter further includes a lens antenna array comprising a plurality of transmitting antenna elements. The first radio frequency (RF) chain is coupled to a first transmitting antenna element of the plurality of transmitting antenna elements to process a first one of the pre-coded signals and a second RF chain is coupled to a second transmitting antenna element of the plurality of transmitting antenna elements to process a second one of the pre-coded signals. The first transmitting antenna element transmits the first pre-coded signal over a multipath channel and the second transmitting antenna transmits the second pre-coded signal over the multipath channel.

The transceiver further includes a beamspace MIMO receiver which includes a lens antenna array comprising a plurality of receiving antenna elements. The receiver further includes, a first RF chain coupled to a first receiving antenna element of the plurality of receiving antenna elements to receive the first pre-coded signal transmitted over the multipath channel, a second RF chain coupled to a second receiving antenna element of the plurality of receiving antenna elements to receive the second pre-coded signal transmitted over the multipath channel and a third RF chain coupled to a third receiving antenna element of the plurality of receiving antenna elements to receive a third pre-coded signal transmitted over the multipath channel, wherein the third pre-coded signal comprises main lobe and sidelobe power from each of the first pre-coded signal and the second pre-coded signal. The receiver further includes a digital decoder to decode each of the received first, second and third pre-coded signals to recover the number of data streams.

Compared to conventional beamspace MIMO techniques, numerical results show that the DSM technique of the present invention can provide more than 50% spectral efficiency enhancement at high signal to noise ratio (SNR).

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE INVENTION

Recent studies on the concept of multiplexing over beamspace multiple-input multiple-output (MIMO) can reduce the need for the use of phase shifters, while keeping the directivity performance at similar levels. Thus, beamspace MIMO provides cost-effective and simple hardware designs for millimeter-wave (mmWave) systems.

However, the number of users/streams that can be supported at the same time-frequency resource is limited to the number of radio-frequency (RF) chains. In accordance with various embodiments of the present invention, to overcome this restriction, a method for dynamic sidelobe multiplexing (DSM) is proposed. The proposed multiplexing technique pre-codes the data transmitted over transmitter beams to open a new path to the receiver. Therefore, the proposed method provides an opportunity to exceed the limits of conventional hardware usage in beamspace MIMO. In specific embodiments, the numerical results shown that the proposed approach can enhance the system performance more that 50% compared to conventional beamspace MIMO techniques currently known in the art.

Figure 1A:
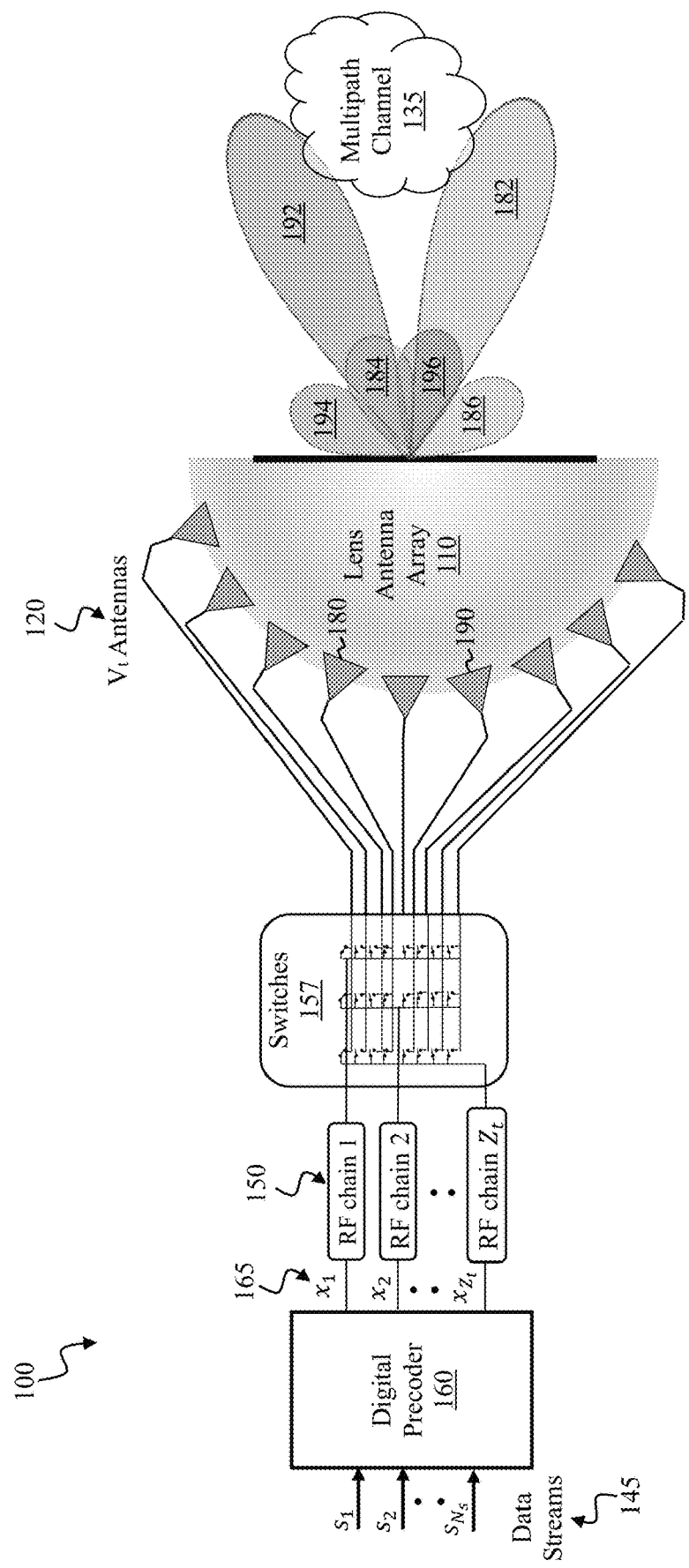
FIG. 1A illustrates an exemplary transmitter of a system model for beamspace MIMI architecture, in accordance with an embodiment of the present invention.
Figure 1B:
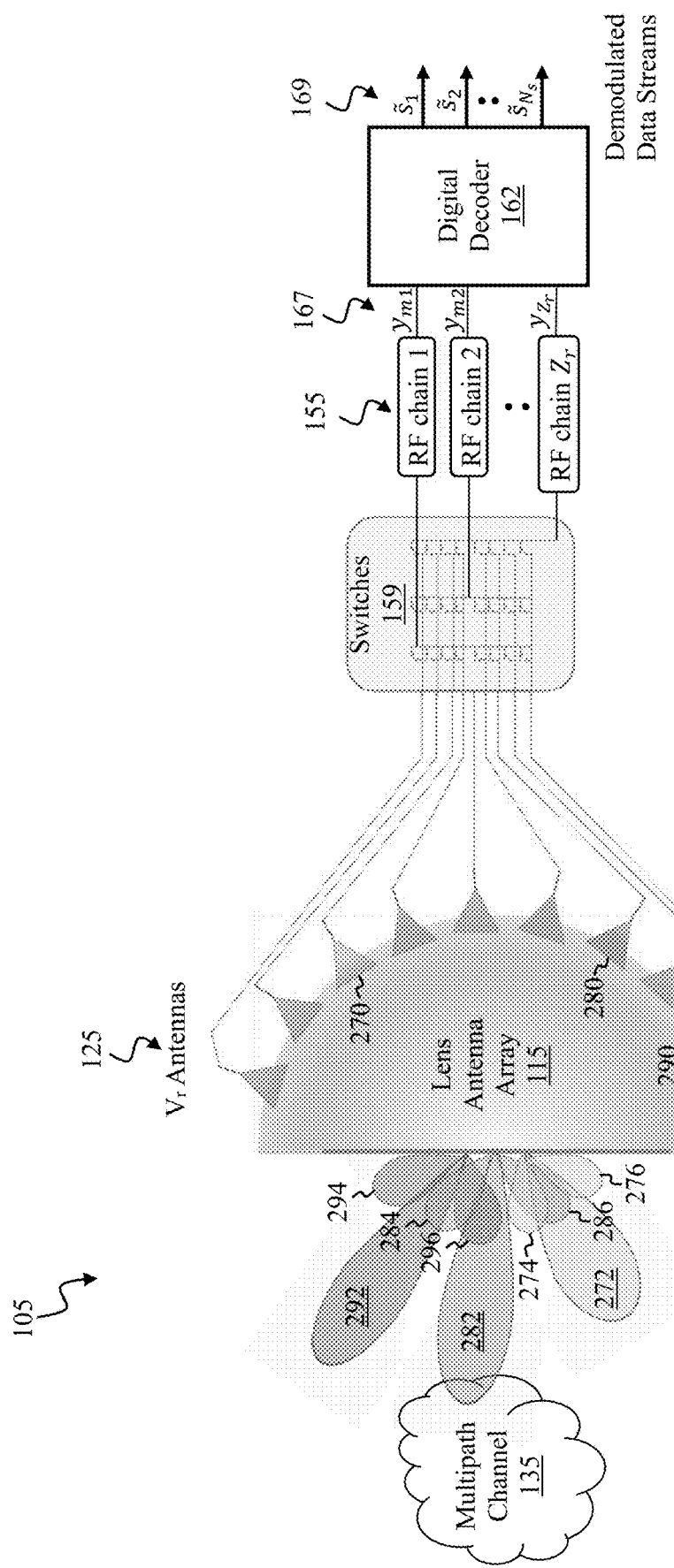
FIG. 1B illustrates an exemplary receiver of a system model for beamspace MIMI architecture, in accordance with an embodiment of the present invention.

A mmWave beamspace MIMO system with the capability of establishing links through multiple beams is illustrated in FIG. 1A and FIG. 1B. As shown in FIG. 1A, a transmitter 100 is equipped with a lens antenna array (LAA) 110 having $V_t$ antenna elements 120. The transmitter 100 receives a number of data streams 145 and pre-codes data streams 145 into a number of pre-coded signals 165 using a digital precoder 160. The pre-coded signals are then processed by a respective one of the RF chains 150 of the transmitter 100 and switched by a set of switches 157 to one of the antennas 120 of the LAA 110 for transmission over the multipath channel 135.

As shown in FIG. 1B, the receiver 105 is equipped with a lens antenna array (LAA) 115 with $V_r$ antenna elements 125. The receiver 105 receives the pre-coded signals transmitted by the LAA 110 of the transmitter 100 over the multipath channel 135. Switches 159 are used to provide the received pre-coded signals to one of the RF chains 155 of the receiver 105 to receive the pre-coded signals 167. The received pre-coded signals 167 are decoded by a digital decoder 162 to recover the data streams 169.

To represent multiple input and multiple output, the noisy signal 140 received at the LAA 115 of the receiver 105 of FIG. 1B can be written in a matrix form as:

$$y = Hx + n, \quad (1)$$

where $x=[x_1, x_2, \ldots, x_{Z_t}]^T$ is the transmitted signal vector using the transmitter beams 130 of the FIG. 1A over the multipath channel 135, while $(.)^T$ denotes the transposition. n is the noise vector where each element is independent and has zero mean complex Gaussian distribution with covariance of $\sigma_n$. H is the narrowband multipath geometrical channel matrix, and it is given as:

$$H = \sum_{i=1}^{P} g_i a_r(\theta_{i,A}) a_t^H(\theta_{i,D}), \quad (2)$$

where P is the number of resolvable channel paths, $g_i$ is the complex channel coefficient on each $i^{th}$ path, $\theta_A$ is angle of arrival (AoA), and $\theta_D$ is angle of departure (AoD). $a_r$ and $a_t$ are the steering vector of the transmitter and receiver, respectively, where $(.)^H$ denotes Hermitian transposition.

In the beamspace MIMO model, the LAA components 120, 125, as shown in FIG. 1A and FIG. 1B, are located in the focal region of the electromagnetic lens and they follow the condition of:

$$\sin(\phi) = \frac{v_j}{D_i}, v_j \in V_j, \quad (3)$$

where $\phi$ is the angle of antenna element relative to the x-axis, and $v_j$ denotes the selected antenna index at transmitter/receiver $j \in \{t, r\}$ for $v_j=1, 2, \ldots, V_j$. The column elements of the steering vector $a_j$ can be given as:

$$a_j(\theta_l) = \sqrt{(\overline{D_j})} \mathrm{sinc}(v_j - \overline{D_j}\sin(\theta_l)), v_j \in V_j \quad (4)$$

where $\overline{D}=D/\lambda_c$ is the lens antenna dimension D normalized by carrier wavelength $\lambda_c$, and $l \in \{D, A\}$. Note that the number of antenna V depends on $\overline{D}$ such as $V=\lfloor 2\overline{D} \rfloor+1$ where $\lfloor . \rfloor$ is the floor function. The "sinc" function formula in (4) represents the angle-dependent energy focusing property of LAA, as is known in the art.

Using (4), the elements $h(v_r, v_t)$ of channel matrix H represent the channel coefficient from transmitting antenna $v_t \in V_t$ to receiving antenna $v_r \in V_r$ and can be given as:

$$h(v_r, v_t) = \sum_{i=1}^{P} g_i \sqrt{(\overline{D_r})(\overline{D_t})} \times \mathrm{sinc}(v_r - \overline{D_r}\sin(\theta_{i,A})) \times \mathrm{sinc}(v_t - \overline{D_t}\sin(\theta_{i,D})) \quad (5)$$

Accordingly, the received signal on the $m^{th}$ antenna of the receiving LAA 115 can be summed through active transmission antennas as:

$$y_{m^{th}} = \Sigma_{v_t^{active}} y(v_t, v_r = m), \quad (6)$$

where $$y(v_t, v_r) = x_{v_t} h_k(v_t, v_r) + n. \quad (7)$$

In order to improve the spectral efficiency in beamspace MIMO systems, a dynamic multiplexing sidelobe multiplexing (DSM) algorithm is proposed using the sidelobe radiation on the beams received at the receiver 105. The goal of the proposed DSM is to transmit a greater number of data streams ($N_s$) 145 than the available RF chains ($Z_t$) 150 at the transmitter 100 ($N_s > Z_t$). To be able to receive the transmitted data streams, the receiver 105 should have the same or a greater number of RF chains ($Z_r$) 155 than the streams ($N_s$) 145 ($Z_r \geq N_s$). Thus, a cost-efficient transmitter 100 (i.e., user equipment (UE)) will be able to transmit more data streams than its original capabilities to a more powerful receiver 105 (i.e., base station (BS)).

While the transmitter and receiver are described as independent in the description of the invention, it is within the scope of the present invention to have the transmitter and receiver incorporated into transceivers, as is commonly known in the art.

To clearly explain the DSM method, it is assumed that the transmitter 100 has two RF chains 150, while the receiver 105 has three RF chains 155. The method can be easily applied to the systems with a plurality of ($Z_t$, $Z_r$) RF chains by arranging them into groups, where each group has two transmitted RF chains 150 and three received RF chains 155.

At the transmitter 100, three data streams $s_1$, $s_2$, $s_3$ 145 are pre-coded by a digital precoder 160 into two pre-coded signals $x_1$, $x_2$ 165 using the following equations:

$$x_1 = s_1\sqrt{\gamma_1} + s_3\sqrt{1-\gamma_1},$$
$$x_2 = s_x\sqrt{\gamma_2} + s_3\sqrt{1-\gamma_2}, \quad (8)$$

where $\gamma \in (0,1)$ defines power ratio between the data streams. Each signal is transmitted over an antenna aperture which defines a beam through a narrowband multipath geometrical channel, as given in (2). As shown in FIG. 1A, each of the two pre-coded signals $x_1$, $x_2$ are processed by a respective RF chain 150 and provided to an antenna of the LAA 110. In particular, a first signal $x_1$ is processed by RF chain 1 and provided to a first antenna element 180 and a second signal $x_2$ is processed by RF chain 2 and provided to a second antenna element 190. The main lobe 182 and sidelobes 184, 186 of the first signal $x_1$ are transmitted over the multipath channel 135 by the first antenna element 180, and the main lobe 192 and sidelobes 194, 196 of the second signal $x_2$ are transmitted over the multipath channel 135 by the second antenna element 190.

In order to receive the multiple data stream, the receiver 105 is implemented to utilize the same number of RF chains 155 as the number of data streams 145, which is three-RF chains, in this particular example. While a first RF chain 1 is receiving the main lobe 282 and sidelobes 184, 186 of $y_{m_1}$ and a second RF chain 2 is receiving the main lobe 292 and sidelobes 194, 196 of $y_{m_2}$ through matching receiving beams 280, 290, respectively, a third RF chain 3 receives the main lobe 272 and sidelobes 274, 276 of $y_{m_3}$ through a third receiver beam 270. Since the third receiver beam 270 does not having a matching transmitter beam at the transmitter 100, it is expected to receive power from the sidelobes of the transmitted beams 184, 186, 194, 196 as well as the main lobes 182, 192, due to multipath channel effects. The received signal at the receiver can be expressed as:

$$\begin{bmatrix} y_{m_1} \\ y_{m_2} \\ y_{m_3} \end{bmatrix} + \begin{bmatrix} h_{m_1,k_1} & h_{m_1,k_2} \\ h_{m_2,k_1} & h_{m_2,k_2} \\ h_{m_3,k_1} & h_{m_3,k_2} \end{bmatrix} \begin{bmatrix} x_1 \\ x_2 \end{bmatrix} + \begin{bmatrix} n_{m_1} \\ n_{m_2} \\ n_{m_3} \end{bmatrix}, \quad (9)$$

where $m \in V_r$ and $k \in V_t$ are the activated received and transmitted antenna indexes, respectively. The channel coefficient between the selected antenna apertures can be easily defined using (5), as $h_{m,k} = h(v_r=m, v_t=k)$.

At the receiver 105, successive interference cancellation (SIC) is applied to ensure a minimum sum link capacity in the presence of the interference between the data streams, as well, improving the SINR for other signals. Assuming perfect channel estimation, the received first two signals $y_{m_1}$ and $y_{m_2}$ 167 are demodulated by the digital decoder 162, under the interference of $s_3$, to get $\tilde{s}_1$ and $\tilde{s}_2$ data streams 169, respectively, as in:

$$\tilde{s}_1 = \mathrm{demod}(y_{m_1}),$$
$$\tilde{s}_2 = \mathrm{demod}(y_{m_2}). \quad (10)$$

Then, these demodulated data streams $\tilde{s}_1$ and $\tilde{s}_2$ 169 are used to remove interference from the third received signal $y_{m_3}$ by subtracting them for the demodulation of $\tilde{s}_3$ as in:

$$\tilde{s}_3 = \text{demod}(y_{m_2} - \tilde{s}_1 h_{m_3,k_1} \sqrt{\gamma_1} - \tilde{s}_2 h_{m_3,k_2} \sqrt{\gamma_2}). \quad (11)$$

Consequently, the capacity of each data stream depends on its signal-to-noise ratio (SNR) and can be expressed as:

$$R = \sum_{q=1}^{N_s} \log_2(1 + \text{SINR}_q) \quad (12)$$

where the SINR can be given as:

$$\text{SINR}_q = \frac{\gamma_q |h_{m_q,k_q}|^2}{\Sigma_{b \neq q} \gamma_b |h(m_q, k_b)|^2 + \Sigma_b (1-\gamma_b) |h(m_q, k_b)|^2 + \sigma_n^2}, q \leq 2, \quad (13)$$

$$\frac{\sum_b (1-\gamma_b) |h(m_q, k_b)|^2}{\sigma_n^2}, q > 2$$

where $q \in \{1, 2, 3\}$ is the transmitted stream index and $b \in \{1, 2\}$ is the transmitted signal index. In order to maximize the total capacity over all the streams, (12) can be optimized as:

$$\gamma, m, k = \arg \max_{\gamma,m,k} R(\gamma, m, k), \quad (14)$$

where $\gamma = [\gamma_1, \gamma_2]$, $m = [m_1, m_2, m_3]$, and $k = [k_1, k_2]$.

Other than the capacity maximization given in (14), the parameters can be optimized to provide fair SNR over each stream. The fairness can be provided as:

$$\gamma, m, k = \arg \max_{\gamma,m,k} \prod_{q=1}^{N_s} \text{SINR}_q(\gamma, m, k). \quad (15)$$

Joint maximization problems in (14) and (15) is a complex problem. In order to simplify this problem and follow a more practical approach, the transmitter beam indexes k and the receiver beam indexes m can be selected to maximize the receiver power for each stream by maximizing the channel gains as follows:

$$\{m_1, k_1\} = \text{argmax}_{m_1,k_1} |h_{m_1,k_1}|^2$$

$$\{m_2, k_2\} = \text{argmax}_{m_2,k_2} |h_{m_2,k_2}|^2$$

$$m_3 = \text{argmax}_{m_3} |h_{m_3,k_3}|^2 + |h_{m_3,k_2}|^2$$

Following the selection of k and m, γ can be optimized using (14) and (15).

In order to evaluate the performance of the proposed DSM method, Monte Carlo simulations have been performed. In the simulations, $Z_t=2$, $Z_r=3$, $V_t=8$ and $V_r=16$ are assumed. Two signals $x_1$ and $x_2$ are transmitted over a mmWave channel that is assumed to have P=48 resolvable paths consisting of randomly generated six multipath clusters and each cluster has randomly generated eight rays. The dashed lines in FIG. 2, FIG. 3, and FIG. 4 represent the conventional multiplexing method in mmWave beamspace MIMO, while the solid lines represent the proposed DSM method in accordance with the present invention.

Figure 2:
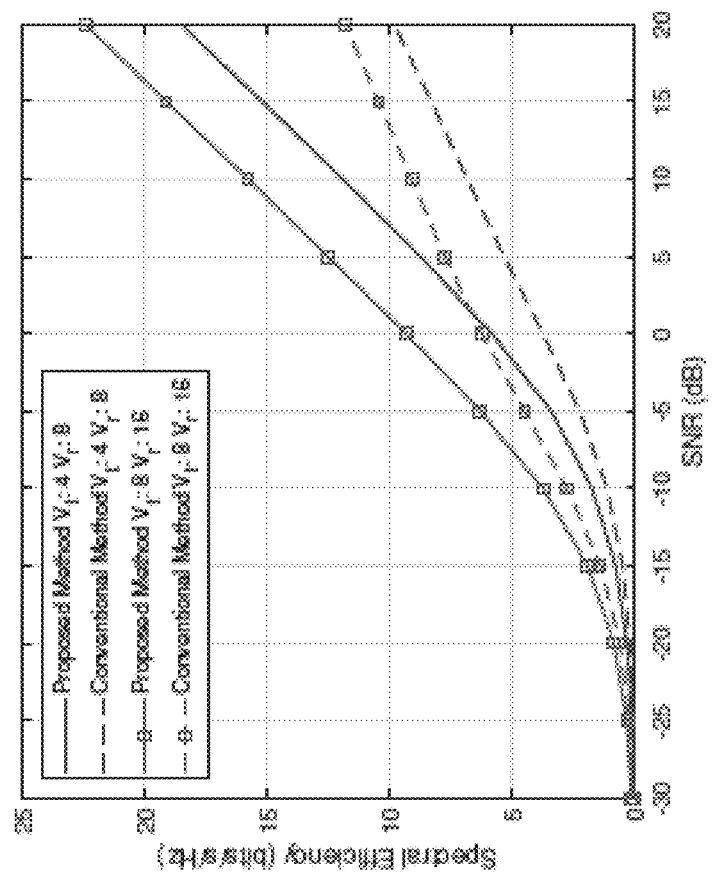
FIG. 2 is graphical illustration of spectral efficiency vs. SNR with capacity optimization, in accordance with an embodiment of the present invention.

In FIG. 2, the spectral efficiency results of the proposed DSM method with capacity goal are presented. The results are compared with the conventional method in different antenna element sizes, i.e., $V_t=8$, $V_r=8$ and $V_t=8$, $V_r=16$ over different SNRs. Quantitatively, the proposed DSM method has about 50% enhancement over the conventional multiplexing method at 5 dB SNR. The trend of this enhancement increases as the SNR increases in the system. Since the conventional method is affected by interference between beams, it converges towards a performance ceiling. It is also noticed that increasing the antenna elements can improve the efficiency.

Figure 3:
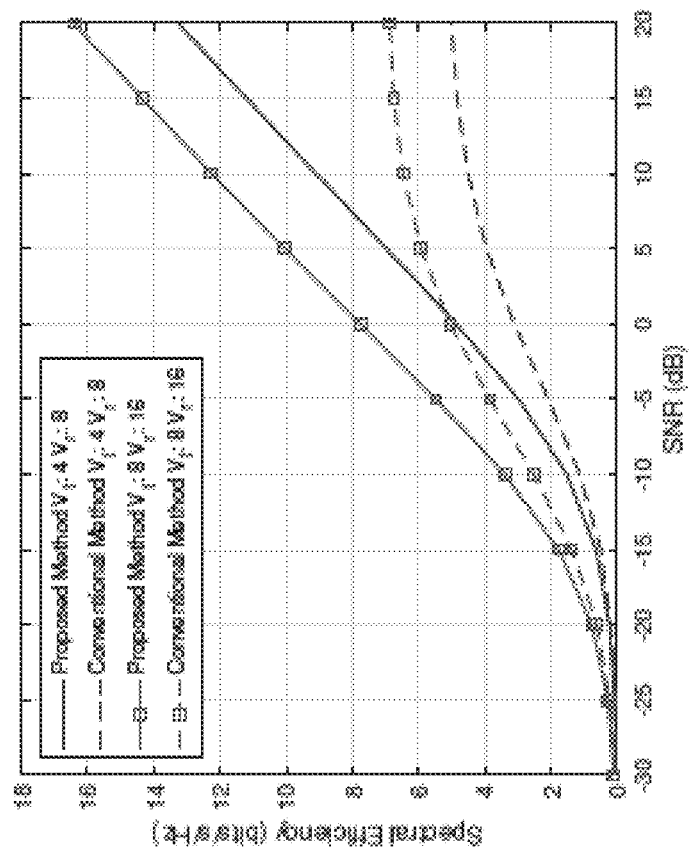
FIG. 3 is a graphical illustration of spectral efficiency vs. SNR with SINR optimization, in accordance with an embodiment of the present invention.

Similarly, FIG. 3 shows the spectral efficiency of the proposed DSM method compared to the conventional multiplexing method. However, this time the γ, m, k parameters are selected using (15). The figure clearly shows that despite the performance degradation, the proposed algorithm can still double the spectral efficiency at high SNR. For example, at 10 SNR value, the proposed DSM method achieved 12 and 9 bits/s/Hz efficiency for $V_t=8$, $V_r=8$ and $V_t=8$, $V_r=16$, respectively, while the conventional multiplexing method can provide around 4 and 6 bit/s/Hz efficiency.

Figure 4:
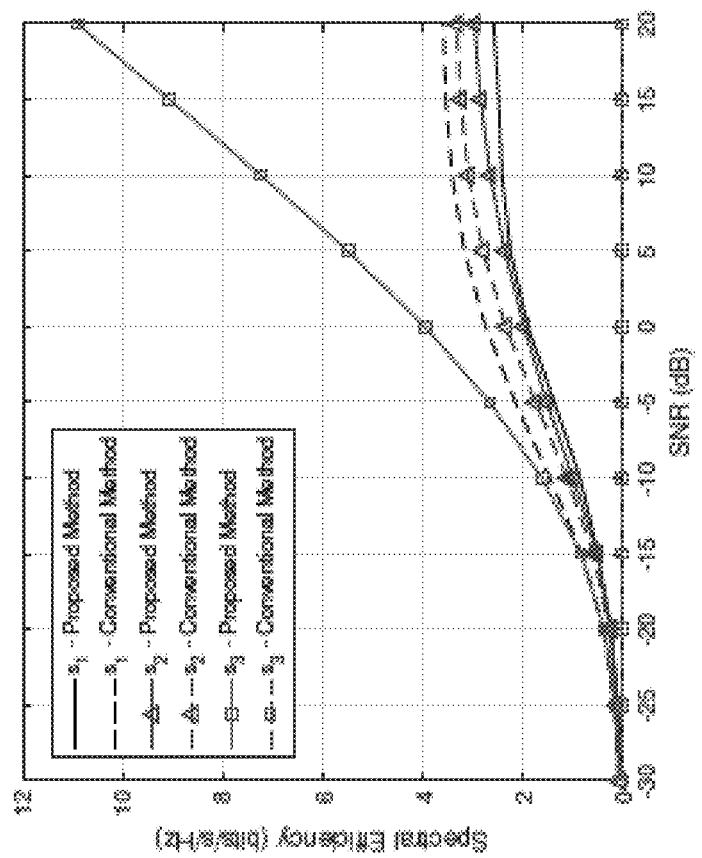
FIG. 4 is a graphical illustration of spectral efficiency of each individual stream vs. SNR for $V_t=4$, $V_r=8$ in accordance with an embodiment of the present invention.

The spectral efficiency versus SNR for individual data streams $s_1$, $s_2$ and $s_3$ is shown in FIG. 4 for $V_t=4$ and $V_r=8$. In the figure, each stream is represented with lines which are separated by their mark. It can be noticed that with small degradation in the $s_1$ and $s_2$ data streams performance, $s_3$ gained a great enhancement in the spectral efficiency and resulted in total performance being improved.

In various embodiments, the present invention provides a method for use with mmWave beamspace MIMO systems that overcomes the restriction of the conventional multiplexing in mmWave beamspace MIMO scheme that is only capable of serving one user/data-stream for each transmitted beam at the same time-frequency resource. In the proposed DSM approach the data is pre-coded at the transmitter to transmit over an insufficient number of beams while receiving a sufficient number of beams at the receiver. Such a method can be advantageous in systems where the transmitter needs to be low cost (i.e., BS). Thus, considering UE and BS examples, using the proposed method, the communication network can provide higher speeds of uplink data or it can simply allow reuse of the extra uplink resources for some other purpose. The approach is clearly a good method for cost efficient designs of internet of things (IoT) devices which makes frequent data uploads to a server.

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

What is claimed is:

1. A method for dynamic sidelobe multiplexing in beamspace multiple-input multiple-output (MIMO) systems, the method comprising:
   receiving a plurality of data streams at a beamspace MIMO transmitter;
   pre-coding a number of the plurality of received data streams into a number of pre-coded signals, wherein the number of data streams is greater than the number of pre-coded signals;
   transmitting a first one of the pre-coded signals through a first radio frequency (RF) chain coupled to a first transmitting antenna element of the beamspace MIMO transmitter and transmitting a second one of the pre-coded signals through a second RF chain coupled to a second transmitting antenna element of the beamspace MIMO transmitter;
   transmitting the first pre-coded signal and the second pre-coded signal over a multipath channel using the respective first transmitting antenna element and second transmitting element of the beamspace MIMO transmitter;
   receiving a first one of the two pre-coded signals transmitted over the multipath channel at a first RF chain coupled to a first receiving antenna element of a beamspace MIMO receiver and receiving a second one of the two pre-coded signals transmitted over the multipath channel at a second RF chain coupled to a second receiving antenna element of the beamspace MIMO receiver;
   receiving a third pre-coded signal transmitted over the multipath channel at a third RF chain coupled to a third receiving antenna element of the beamspace MIMI receiver, wherein the third pre-coded signal comprises main lobe and sidelobe power from each of the first pre-coded signal and the second pre-coded signal; and
   decoding each of the received first, second and third pre-coded signals to recover the number of data streams.

2. The method of claim 1, wherein the beamspace MIMO transmitter comprises a lens antenna array comprising a plurality of transmitting antenna elements and wherein the beamspace MIMO receiver comprises a lens antenna array comprising a plurality of receiving antenna elements.

3. The method of claim 1, wherein the beamspace MIMO transmitter comprises a number of radio frequency (RF) chains and the beamspace MIMO receiver comprises a number of RF chains, and wherein the number of RF chains of the beamspace MIMO receiver is greater than or equal to the number of data streams received at the beamspace MIMO transmitter.

4. The method of claim 1, wherein pre-coding each of the number of data streams to generate the number of pre-coded signals comprises, determining a power ratio between the number of data streams and pre-coding each of the number of data streams based upon the power ratio between the number of data streams.

5. The method of claim 1, wherein each of the first transmitting antenna element and the second transmitting antenna element define a beam through a narrowband multipath geometrical channel.

6. The method of claim 1, wherein the first transmitting antenna element matches the first receiving antenna element and wherein the second transmitting antenna element matches the second receiving antenna element.

7. The method of claim 1, wherein the third receiving antenna element does not have a matching third transmitting antenna element at the beamspace MIMO transmitter.

8. The method of claim 1, further comprising performing successive interference cancellation (SIC) at the beamspace MIMO receiver.

9. The method of claim 1, wherein decoding each of the received first, second and third pre-coded signals to recover the three data streams further comprises:
   demodulating the first pre-coded signal based upon an interference of the third pre-coded signal to recover a first data stream;
   demodulating the second pre-coded signal based upon the interference of the third pre-coded signal to recover a second data stream; and
   using the first data stream and the second data stream to remove the interference from the third pre-coded signal by subtraction to recover a third data stream.

10. A method for dynamic sidelobe multiplexing in beamspace multiple-input multiple-output (MIMO) systems, the method comprising:
   receiving a plurality of data streams at a beamspace MIMO transmitter;
   pre-coding a number of the plurality of received data streams into a number of pre-coded signals, wherein the number of data streams is greater than the number of pre-coded signals;
   transmitting a first one of the pre-coded signals through a first radio frequency (RF) chain coupled to a first transmitting antenna element of the beamspace MIMO transmitter and transmitting a second one of the pre-coded signals through a second RF chain coupled to a second transmitting antenna element of the beamspace MIMO transmitter;

transmitting the first pre-coded signal and the second pre-coded signal over a multipath channel using the respective first transmitting antenna element and second transmitting element of the beamspace MIMO transmitter;

receiving a first one of the two pre-coded signals transmitted over the multipath channel at a first RF chain coupled to a first receiving antenna element of a beamspace MIMO receiver and receiving a second one of the two pre-coded signals transmitted over the multipath channel at a second RF chain coupled to a second receiving antenna element of the beamspace MIMO receiver;

receiving a third pre-coded signal transmitted over the multipath channel at a third RF chain coupled to a third receiving antenna element of the beamspace MIMI receiver, wherein the third pre-coded signal comprises main lobe and sidelobe power from each of the first pre-coded signal and the second pre-coded signal;

demodulating the first pre-coded signal based upon an interference of the third pre-coded signal to recover a first data stream;

demodulating the second pre-coded signal based upon the interference of the third pre-coded signal to recover a second data stream; and using the first data stream and the second data stream to remove the interference from the third pre-coded signal by subtraction to recover a third data stream.

11. A transceiver using dynamic sidelobe multiplexing for beamspace MIMO systems, the transceiver comprising:
a beamspace MIMO transmitter comprising;
a digital precoder for pre-coding a number of a plurality of received data streams into a number of pre-coded signals, wherein the number of data streams is greater than the number of pre-coded signals;
a transmitting lens antenna array comprising a plurality of transmitting antenna elements;
a first radio frequency (RF) chain coupled to a first transmitting antenna element of the plurality of transmitting antenna elements, the first RF chain to process a first one of the pre-coded signals and a second RF chain coupled to a second transmitting antenna element of the plurality of transmitting antenna elements, the second RF chain to process a second one of the pre-coded signals;
the first transmitting antenna element to transmit the first pre-coded signal over a multipath channel and the second transmitting antenna to transmit the second pre-coded signal over the multipath channel;
a beamspace MIMO receiver comprising;
a receiving lens antenna array comprising a plurality of receiving antenna elements;
a first RF chain coupled to a first receiving antenna element of the plurality of receiving antenna elements, the first RF chain to receive the first pre-coded signal transmitted over the multipath channel and a second RF chain coupled to a second receiving antenna element of the plurality of receiving antenna elements, the second RF chain to receive the second pre-coded signal transmitted over the multipath channel;
a third RF chain coupled to a third receiving antenna element of the plurality of receiving antenna elements, the third RF chain to receive a third pre-coded signal transmitted over the multipath channel, wherein the third pre-coded signal comprises main lobe and sidelobe power from each of the first pre-coded signal and the second pre-coded signal; and
a digital decoder to decode each of the received first, second and third pre-coded signals to recover the number of data streams.

12. The transceiver of claim 11, wherein the beamspace MIMO transmitter comprises a number of radio frequency (RF) chains and the beamspace MIMO receiver comprises a number of RF chains, and wherein the number of RF chains of the beamspace MIMO receiver is greater than or equal to the number of data streams received at the beamspace MIMO transmitter.

13. The transceiver of claim 12, wherein the beamspace MIMO transmitter further comprises a plurality of switches to couple the number of RF chains to a respective one of the plurality of transmitting antenna elements.

14. The transceiver of claim 12, wherein the beamspace MIMO receiver further comprises a plurality of switches to couple the number of RF chains to a respective one of the plurality of receiving antenna elements.

15. The transceiver of claim 11, wherein pre-coding each of the number of data streams to generate the number of pre-coded signals comprises, determining a power ratio between the number of data streams and pre-coding each of the number of data streams based upon the power ratio between the number of data streams.

16. The transceiver of claim 11, wherein each of the first transmitting antenna element and the second transmitting antenna element define a beam through a narrowband multipath geometrical channel.

17. The transceiver of claim 11, wherein the first transmitting antenna element matches the first receiving antenna element and wherein the second transmitting antenna element matches the second receiving antenna element.

18. The transceiver of claim 11, wherein the third receiving antenna element does not have a matching third transmitting antenna element at the beamspace MIMO transmitter.

19. The transceiver of claim 11, wherein the digital decoder is further configured to:
demodulate the first pre-coded signal based upon an interference of the third pre-coded signal to recover a first data stream;
demodulate the second pre-coded signal based upon the interference of the third pre-coded signal to recover a second data stream; and
use the first data stream and the second data stream to remove the interference from the third pre-coded signal by subtraction to recover a third data stream.

* * * * *